(12) United States Patent
Zhu et al.

(10) Patent No.: US 6,601,087 B1
(45) Date of Patent: Jul. 29, 2003

(54) INSTANT DOCUMENT SHARING

(75) Inventors: Min Zhu, Los Altos Hills, CA (US);
Guanghong Yang, Mountain View, CA (US)

(73) Assignee: WebEx Communications, Inc., San Jose, CA (US)

( * ) Notice: Subject to any disclaimer, the term of this patent is extended or adjusted under 35 U.S.C. 154(b) by 0 days.

(21) Appl. No.: 09/442,424

(22) Filed: Nov. 17, 1999

Related U.S. Application Data

(60) Provisional application No. 60/109,026, filed on Nov. 18, 1998.

(51) Int. Cl.[7] .............................................. G06F 15/16
(52) U.S. Cl. ........................ 709/205; 709/204; 709/246
(58) Field of Search ................................. 709/204, 205, 709/245, 246

(56) References Cited

U.S. PATENT DOCUMENTS

| | | | | |
|---|---|---|---|---|
| 5,051,926 A | * | 9/1991 | Stevens et al. ............ | 358/1.14 |
| 5,577,188 A | | 11/1996 | Zhu ........................... | 395/326 |
| 5,623,603 A | | 4/1997 | Jiang et al. ................ | 395/200 |
| 5,694,544 A | * | 12/1997 | Tanigawa et al. .......... | 345/753 |
| 5,903,716 A | * | 5/1999 | Kimber et al. .............. | 358/1.13 |
| 5,944,791 A | | 8/1999 | Scherphier .................. | 709/218 |
| 6,119,137 A | * | 9/2000 | Smith et al. ................. | 707/513 |
| 6,144,991 A | * | 11/2000 | England ...................... | 345/733 |
| 6,185,683 B1 | * | 2/2001 | Ginter et al. ................. | 705/52 |
| 6,266,150 B1 | * | 7/2001 | Brossman et al. ......... | 358/1.12 |
| 6,343,313 B1 | * | 1/2002 | Salesky et al. ............. | 345/751 |

* cited by examiner

*Primary Examiner*—Mehmet B. Geckil
(74) *Attorney, Agent, or Firm*—Fish & Richardson P.C.

(57) ABSTRACT

An apparatus, method, and computer program product for instant document sharing. In one embodiment, referred to as "document sharing," a file is converted to a "shared document" which is distributed to the members of a data conference for review. In another embodiment, referred to as "application viewing," the "owner" of a document shares the screens created by an application associated with the document. The other members of the data conference can view the screens, but cannot interact with the application. In another embodiment, referred to as "application sharing," the "owner" of a document shares the screens created by an application associated with the document. The other members of the data conference can view the screens and interact with the application.

44 Claims, 14 Drawing Sheets

INSTANT DOCUMENT SHARING

RELATED APPLICATIONS

This application claims the benefit of U.S. Provisional Application No. 60/109,026, filed Nov. 18, 1998.

BACKGROUND OF THE INVENTION

1. Field of the Invention

The present invention relates generally to data conferencing, and more particularly to instant document sharing in a data conference.

2. Related Art

Whenever two or more people are involved in the preparation of a document, whether it be a financial spread sheet, a CAD design, a circuit schematic layout, an organization report, a bit map image, etc., succeeding drafts of the document are prepared, circulated, and modified in the process. Each person annotates his or her remarks on the document and forwards it to the next person. Typically, several drafts of the document will be circulated before a final draft is produced. This is a very time-consuming process.

In the case where the reviewers involved in this document preparation process are at different geographical locations, getting the document from one location to another location and back becomes another tedious and time-consuming task. The document must be mailed or faxed to that person, further complicating the entire process.

One alternative method to this process is to hold meetings where the reviewers gather and comment on the document with the hope to reduce the number of drafts needed before a final draft is produced. The shortcoming with this method is that there may be significant travel time and travel cost in getting everyone to the same location. In addition, the final draft of the document is usually circulated again for final comments.

One solution to this problem is to use a teleconferencing software program to share the document among the geographically dispersed reviewers. This process is often referred to as "data conferencing." By using computer network connections, modem-connected phone lines, and the like, everyone can be connected via his or her computer. By using the teleconferencing software program, everyone's computer screen displays the same document. In addition to using the software program and network or modem connections, conference calling over the voice phone lines or through the software program creates a dynamic and live atmosphere where everyone can participate in the discussion and refer to the document displayed on the screen.

SUMMARY OF THE INVENTION

The present invention is an apparatus, method, and computer program product for instant document sharing. In one embodiment, referred to as "document sharing," a file is converted to a "shared document" which is distributed to the members of a data conference for review. The method of this embodiment includes printing the file, on a local computer, to a virtual printer from an application associated with the file, thereby creating the shared document; and sending the shared document to one or more remote computers, where the shared document is displayed by a viewer application.

In another embodiment, referred to as "application viewing," the "owner" of a document shares the screens created by an application associated with the document. The other members of the data conference can view the screens, but cannot interact with the application. Only the owner can interact with the application. The method of this embodiment includes invoking the application on a local computer, thereby generating an application screen. The application screen is sent to a virtual device, thereby creating a "shared screen." The shared screen is sent to a remote server for distribution to remote computers, where the shared screen is displayed by a viewer application. The user of the local computer (referred to as the "owner") provides user input while editing the shared screen. The user input drives the application to edit the application screen based on the user input. In response, the application provides an application screen update. The application screen update is sent to the virtual device, thereby creating a shared screen update. The shared screen update is sent to the remote server for distribution to the remote computers, thereby updating the display of the application screen by the viewer applications.

In another embodiment, referred to as "application sharing," the "owner" of a document shares the screens created by an application associated with the document. The other members of the data conference can view the screens and interact with the application. The method of this embodiment includes invoking the application on a local computer, generating an application screen. The application screen is sent to a virtual device, creating a shared screen. The shared screen is sent to a remote server for distribution to the remote computers used by the members of the data conference, where the shared screen is displayed by a viewer application. The members edit the shared screen, thereby generating user input that is sent to the local computer. The user input drives the application to edit the application screen based on the user input. In response, the application provides an application screen update. The application screen update is sent to the virtual device, thereby creating a shared screen update. The shared screen update is sent to the remote server for distribution to the remote computers, thereby updating the display of the application screen by the viewer applications.

In all embodiments, an annotation mode is available, where a transparent window is displayed over the shared document. Users can create objects to be displayed in the transparent window, thereby annotating the document.

One advantage of the present invention is that, by sharing documents in a client-server system, it provides robust, scalable, instant document sharing.

Further features and advantages of the present invention as well as the structure and operation of various embodiments of the present invention are described in detail below with reference to the accompanying drawings.

BRIEF DESCRIPTION OF THE DRAWINGS

The present invention will be described with reference to the accompanying drawings.

DESCRIPTION OF THE PREFERRED EMBODIMENTS

The present invention is described in terms of the above example. This is for convenience only and is not intended to limit the application of the present invention. In fact, after reading the following description, it will be apparent to one skilled in the relevant art how to implement the present invention in alternative embodiments.

Introduction

Figure 1:
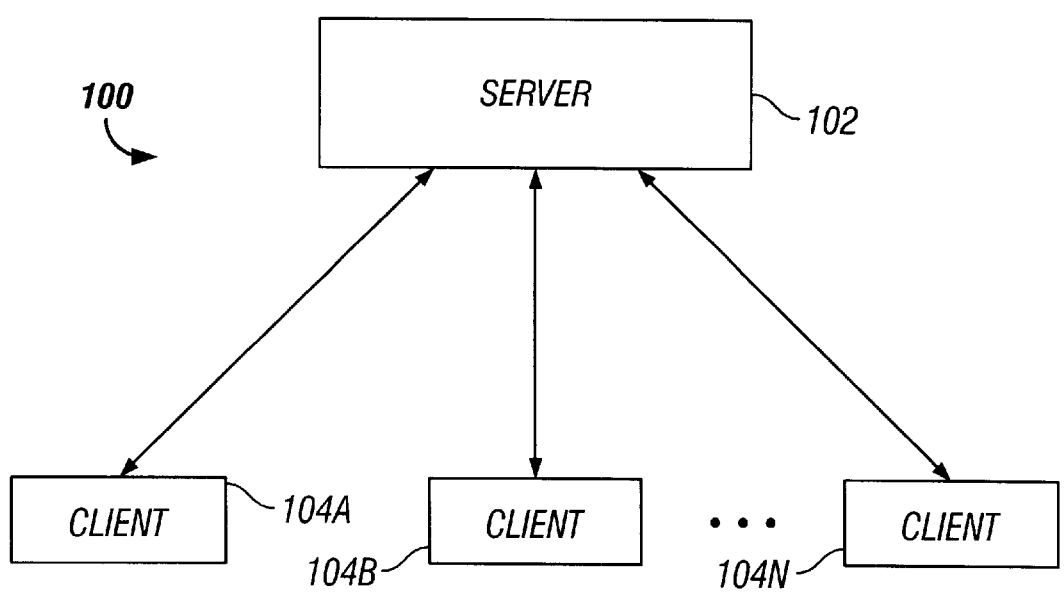
FIG. 1 depicts an example client-server system in which the present invention may be used.

The present invention is an apparatus, method, and computer program product for sharing documents and applications in a client-server system having multiple remote clients. FIG. 1 depicts an example client-server system 100 in which the present invention may be used. System 100 includes a server 102 and a plurality of clients 104A, 104B, 104N. The present invention is usually invoked after a data conference has been established. Methods for establishing data conferences among clients are well-known in the relevant arts.

The present invention provides four modes to support different kinds of data sharing and collaboration: document sharing mode, application viewing mode, application sharing mode, and annotation mode. In each mode, a document is shared among the clients.

In each mode, a client assumes one of four roles: owner, host, editor, and spectator. The owner is client that provides the document. The host is the client that has control of the data conference. An editor is a client that is allowed to edit the document. An annotator is a client that can edit a transparent window that overlays the document. A spectator is a client that can view the document and transparent window, but cannot edit them.

Figure 2:
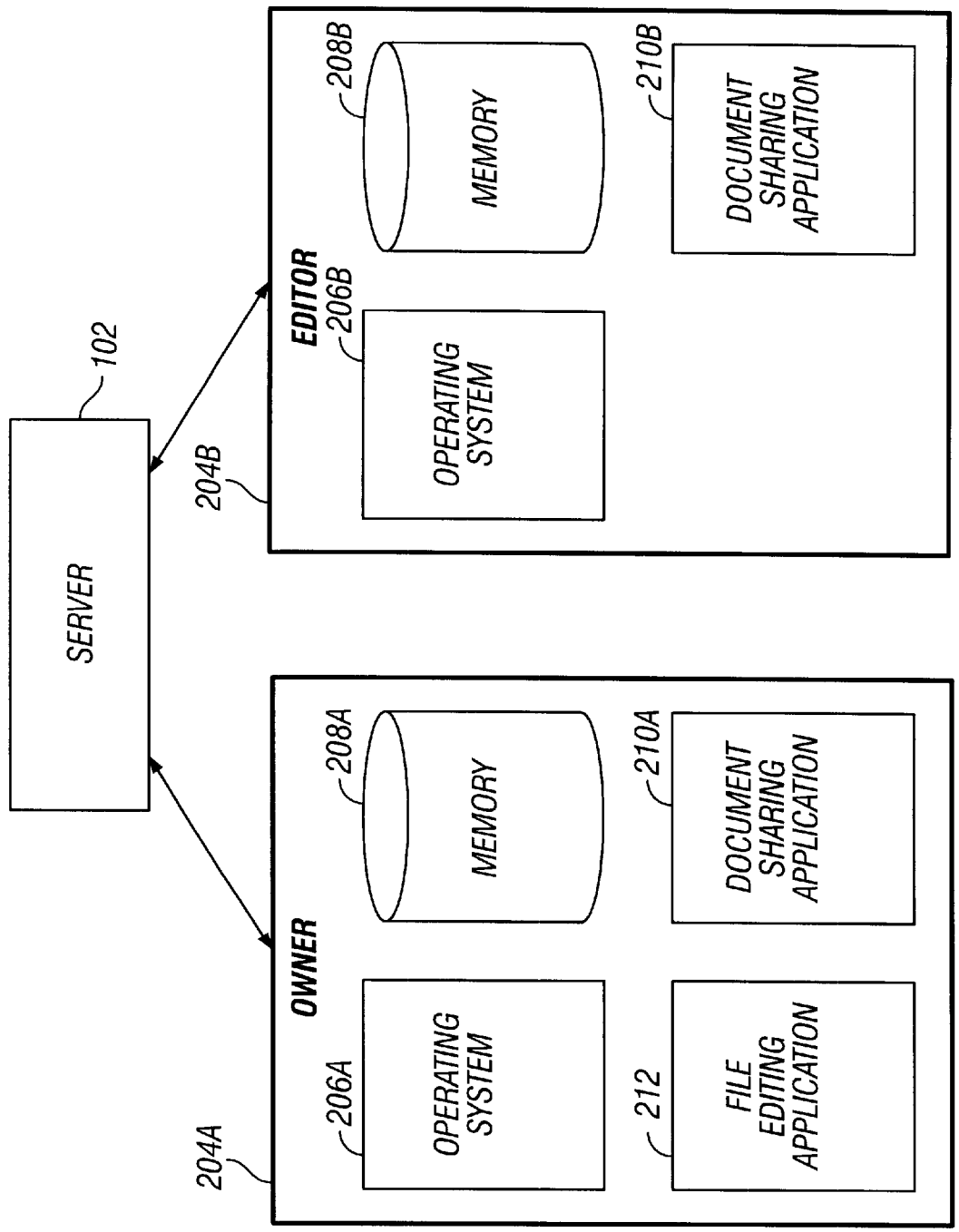
FIG. 2 depicts two clients engaged in a data conference using a server.

FIG. 2 depicts two clients 204 engaged in a data conference using a server 102. One key advantage of using a client-server architecture rather than a peer-to-peer architecture is that no client is burdened with communicating with all of the other clients. It merely communicates with the server. This advantage permits the system to be highly scalable, for example, to serve a data conference involving a large number of clients.

Referring to FIG. 2, each client includes an operating system 206, such as Windows, a memory 208, and a document sharing application 210. Client 204A has assumed the role of owner, and so includes a file editing application 212 that is associated with the document to be shared. For example, the file editing application can be Microsoft Word, and the document to be shared can be a Microsoft Word document. client 204B has assumed the role of editor.

Figure 3:
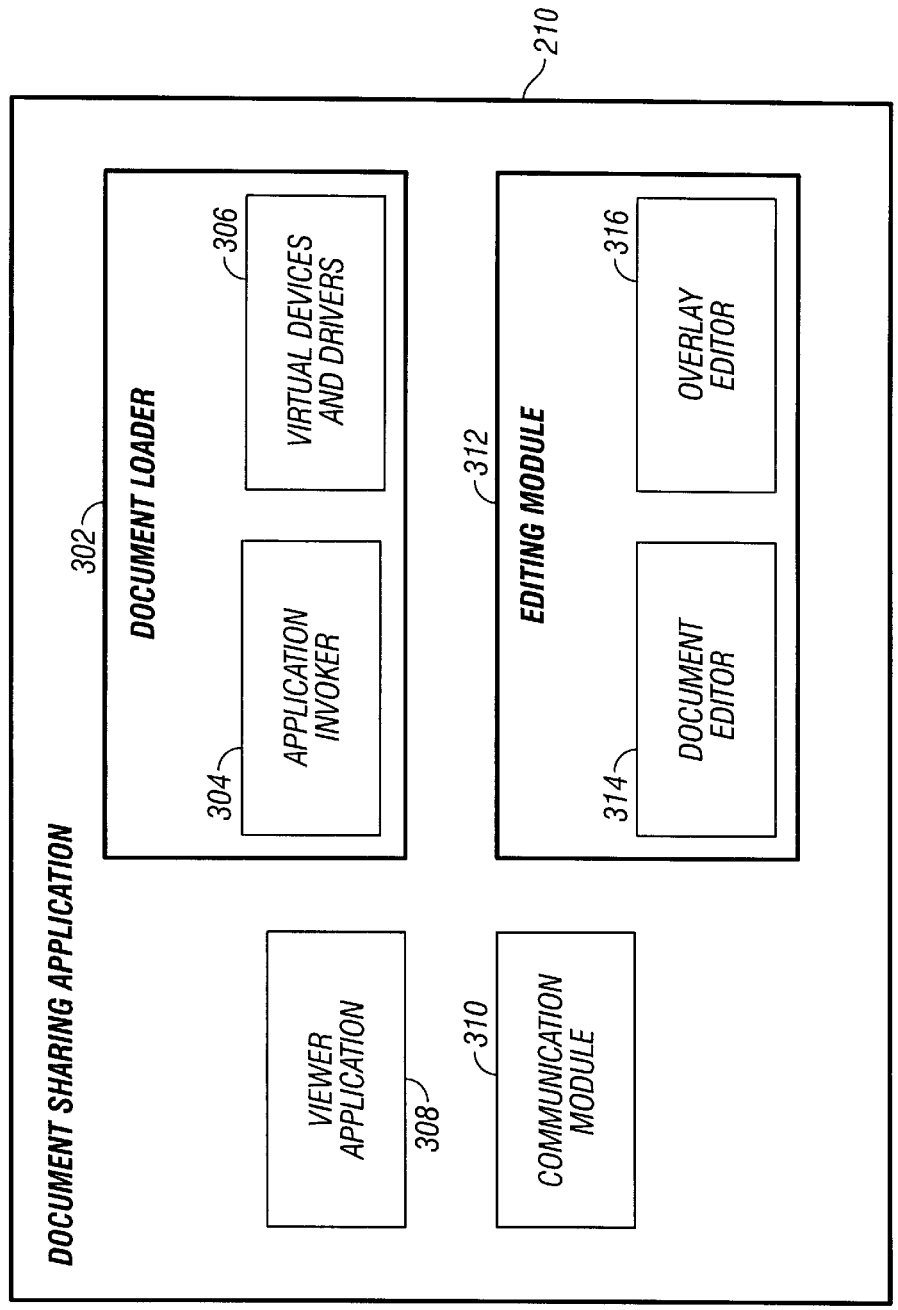
FIG. 3 is a block diagram of document sharing application according to a preferred embodiment of the present invention.

FIG. 3 is a block diagram of document sharing application 210 according to a preferred embodiment of the present invention. In a preferred embodiment, document sharing application 210 is configured as a browser plug-in that can be downloaded from the Internet and installed on a computer running a Windows-type operating system and a browser such as Windows Internet Explorer.

In order to share a document, document sharing application 210 first converts the document to another form by "loading" the document, as will be discussed in detail below. Therefore, the document sharing application 210 includes document loader 302. Depending on the sharing mode, document loading may involve invoking an application associated with the document. Accordingly, document loader 302 includes an application invoker 304. The present invention also uses virtual devices and drivers in document loading. Accordingly, document loader 302 includes virtual devices and drivers 306.

When a document has been loaded, a viewer application 308 allows the user to view the document. A client shares a loaded document by transmitting data to other clients, and receiving such data, using communication module 310. Methods for exchanging such data are discussed extensively in U.S. Pat. No. 5,623,603, assigned to the assignee of the present application, and the disclosure thereof incorporated herein by reference in its entirety.

An editing module 312 enables users to perform editing functions. Document editor 314 allows users to edit a shared document. Overlay editor 316 allows users to edit the transparent overlay screen. Annotating the transparent window and sending data representing the annotations to a remote computer, where the annotations are drawn on the display, is discussed extensively in U.S. Pat. No. 5,577,188, assigned to the assignee of the present application, and the disclosure thereof incorporated herein by reference in its entirety.

Structured System Programming Environment

Figure 4:
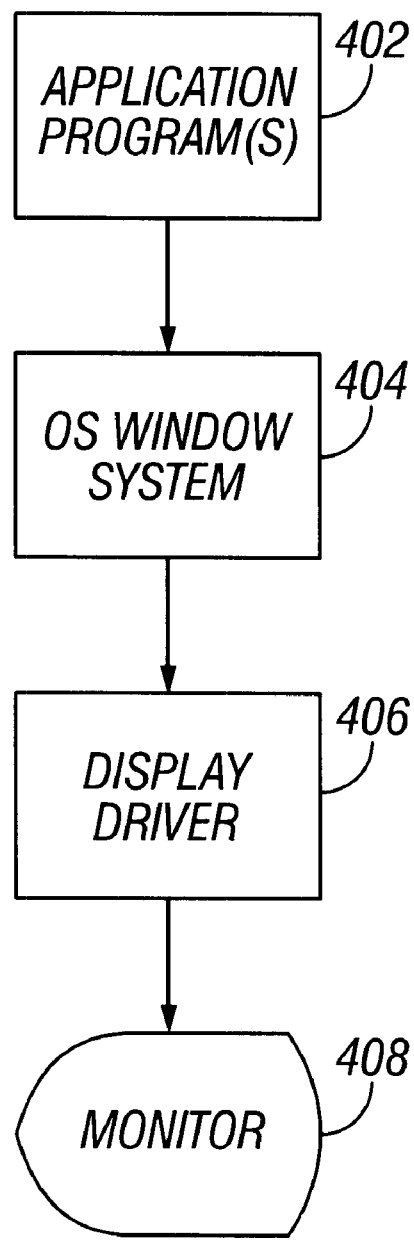
FIG. 4 depicts the software layers in a structured system environment.
Figure 5:
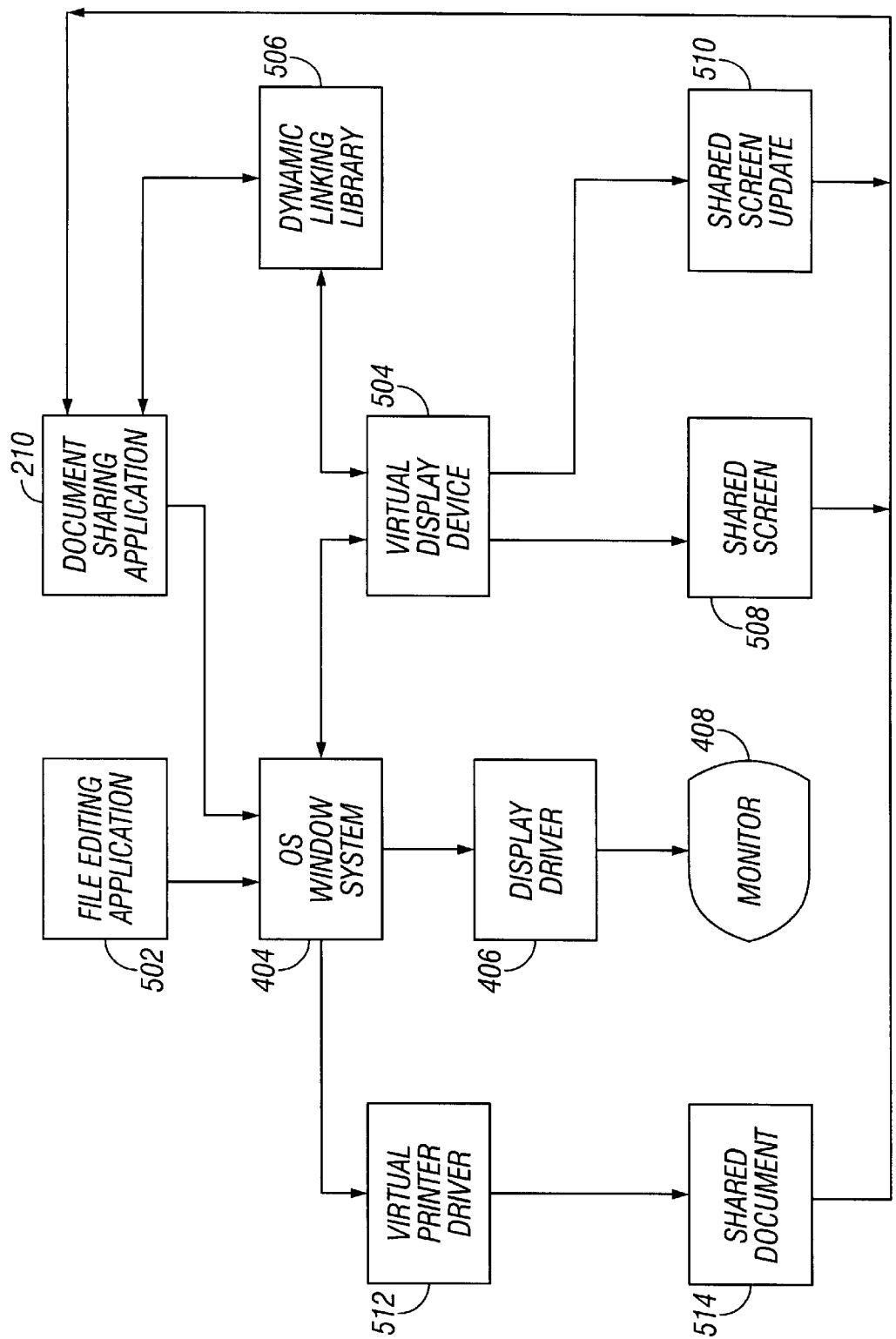
FIG. 5 depicts the software layers in a structured system environment as modified by a preferred embodiment of the present invention.

Before proceeding to the discussion of the methods of document sharing, the software layers in a structured system programming environment such as Microsoft Windows are explained. Referring to FIGS. 4 and 5, in starting the document sharing application 210, the software layers in a structured system programming environment are modified. FIG. 4 depicts the software layers in a structured system environment. In this environment, a running application program 402 interfaces with input and output devices strictly through the operating system's Window system environment, represented by OS Window system 404. When the application program requests the OS Window system to write a character to the screen, the OS Window system in turn directs a display driver 406 to write the character to the monitor 408. A driver such as a display driver is a software program written specifically to handle a specific device or device type, such as monitor 408. For example, there are several standards of display resolution with computer monitors. A display driver is needed for each standard in order to control and interface with each type of monitor.

Display driver 406 tells the monitor 408 specifically how to write a character on the screen. For example, in an application program such as a word processor running on top of OS Window system 404, when the user inputs a character "a" from the keyboard and when the word processor receives the character "a" as input, the word processor will display the character "a" on the screen at the right place to reassure the user that he or she has input a character "a". To write the character "a" to the screen, the word processor calls a OS Window system 404 write-to-screen routine, specifying the character "a" and the location on the screen to place the character. The OS Window system 404 routine in turn calls the display driver with the given information, and the display driver specifically tells the computer screen the placement of dots on the screen to compose the visual image resembling the character "a".

In activating document sharing application 210, referring to FIG. 5, the software layer structure is modified. The application call to OS Window system 404 is redirected to a virtual display device 504. Virtual display device 504 is one of the virtual devices and drivers 306 within document loader 302.

In a preferred embodiment, redirection of the application calls to OS Window system is accomplished by renaming the appropriate OS Window System calls with predefined alternate calls and naming the virtual display device to the OS Window system's original calls. When the application calls the OS Window System via its name, it is calling the virtual display device rather than the OS Window System. The virtual display device calls the OS Window system through its predefined names. The virtual display device calls the OS Window system with the information to place on the screen as requested by a file editing application 502, which can be any application such as a word processor.

In one embodiment, virtual display driver 504 reports the screen updates to document sharing application 210 via dynamic link library 506. When the screen updates are finished, document sharing application 210 reads the screen updates stored in dynamic link library 506. In annotation mode, document sharing application 210 checks for overlapping screen objects and re-draws the annotation objects if necessary. This process is fully explained in U.S. Pat. No. 5,577,188.

In another embodiment, document sharing application 210 creates a shared screen 508, or a shared screen update 510, which is passed directly to document sharing application 210 for display, and for transmission to other clients in the data conference for display to other users. This embodiment is used in the application viewing and application sharing modes, as described in detail below.

In document sharing mode, a representation of the entire document is sent to each client's viewer application 308. In one embodiment, this is accomplished by using a virtual printer driver 512, rather than a virtual display driver. The document to be shared is printed from its associated file editing application 502 to virtual printer driver 512, creating a shared document 514 in a predefined format. Shared document 514 is passed directly to document sharing application 210 for display, and for transmission to other clients in the data conference for display to other users.

Document Sharing Mode

Figure 6:
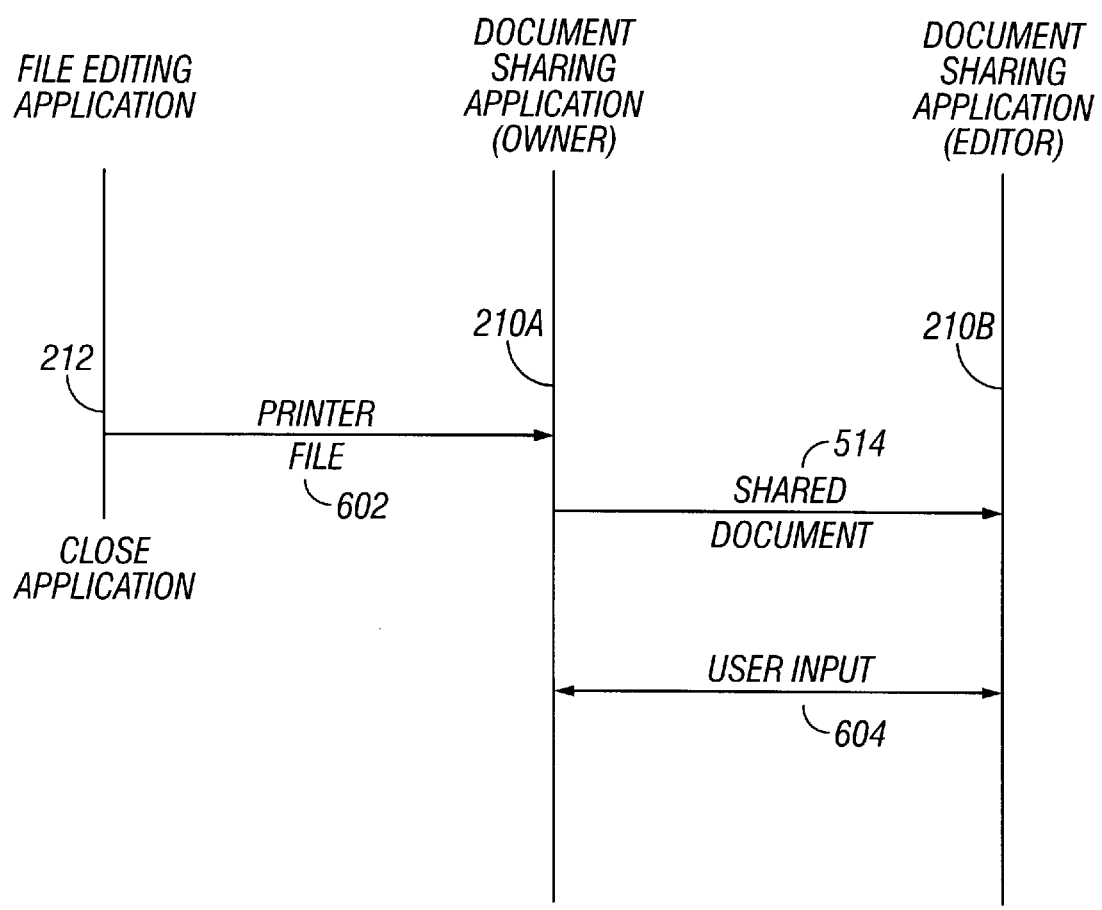
FIG. 6 is a flow diagram depicting the operation of document sharing mode according to a preferred embodiment of the present invention.
Figure 7:
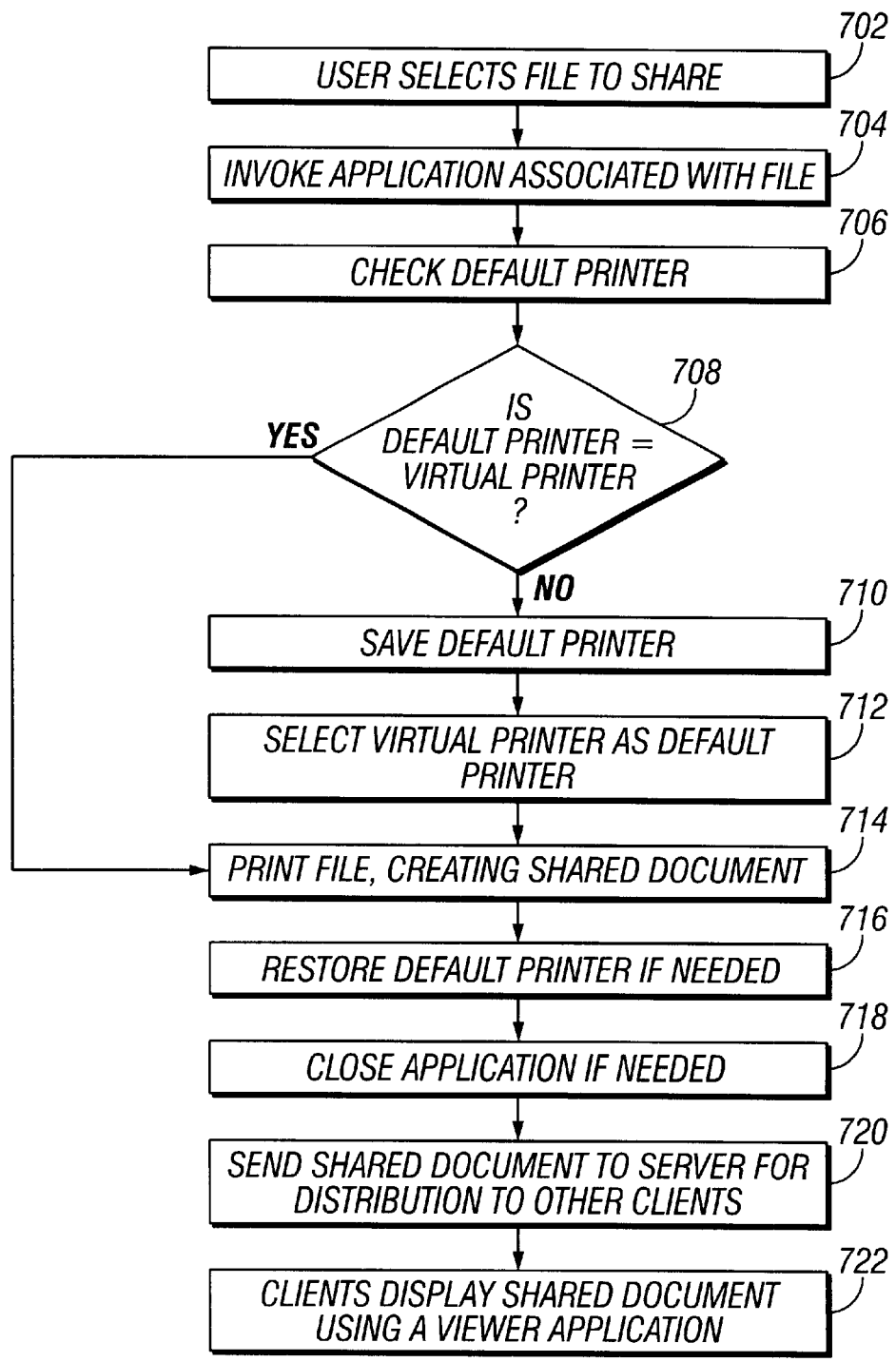
FIG. 7 is a flowchart depicting the operation of document sharing mode according to a preferred embodiment of the present invention.

FIG. 6 is a flow diagram depicting the operation of document sharing mode according to a preferred embodiment of the present invention. FIG. 6 depicts the data flows between file editing application 212, document sharing application 210A running on owner client 204A and document sharing application 210B running on editor client 204B. FIG. 7 is a flowchart depicting this operation.

Referring to FIG. 7, the user of owner client 204A selects a file to share in step 702. In response, the application invoker of document sharing application 210A invokes the file editing application 212 associated with the selected file in step 704. In a preferred embodiment, the application invoker employs automatic application association to select the associated file editing application based on associations established by the operating system according to methods well-known in the relevant arts. If the file editing application is already running, step 704 merely involves opening the selected file using the associated file editing application. However, if the file editing application is not open when the file is selected, the file editing application is launched first.

The default printer associated with file editing application 212 or Windows is checked in step 706. If the default printer is not set to be the virtual printer associated with virtual printer driver 512, then the default printer is saved in step 710 and the virtual printer is selected as the default printer in step 712. Otherwise, steps 710 and 712 are skipped.

The selected file is then printed to the virtual printer in step 714. Referring to FIG. 5, this operation entails redirecting the print call from file editing application 502 at the OS Window System 404 to virtual printer driver 512, thereby creating shared document 514. Shared document 514 is then passed to document sharing application 210 for viewing and distribution. If necessary, the default printer is restored in step 716. If file editing application 502 was launched in step 704, then it is closed in step 718.

Document sharing application 210, on receipt of shared document 514, sends the shared document to server 102 for distribution to the other clients in the data conference. All of the clients in the data conference then display the shared document using viewer application 308, as shown in step 722.

In FIG. 6, time flows from top to bottom. Referring to that figure, virtual printer driver 512 generates printer file 602 which is modified by document sharing application 210A to create a shared document 514. Document sharing application 210A then displays shared document 514 and forwards it to document sharing application 210B for display. Using annotation mode, the two document sharing applications can exchange user input 604 to draw various objects upon a transparent window overlaying the shared document 514.

Application Viewing Mode

Figure 8:
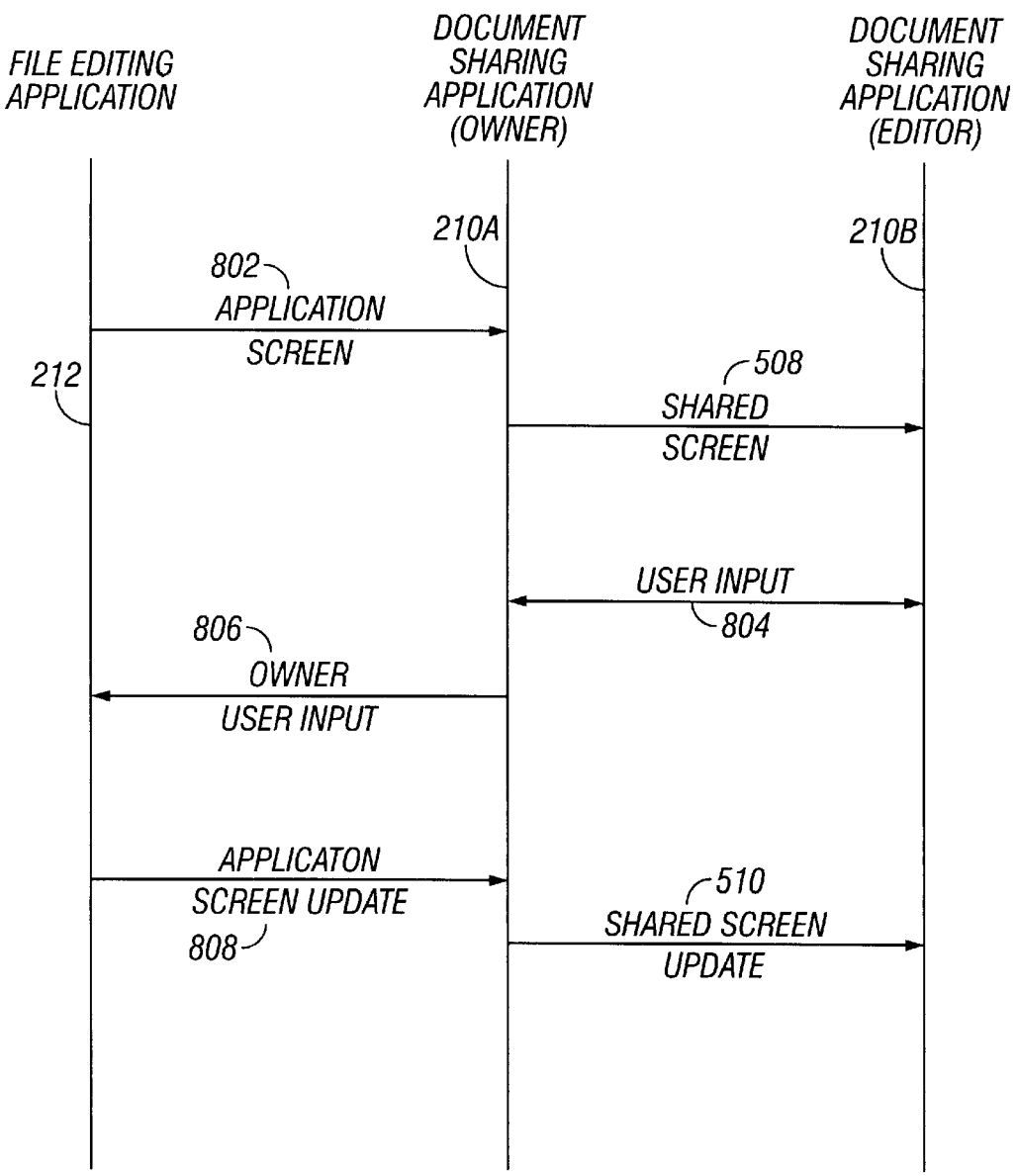
FIG. 8 is a flow diagram depicting the operation of application viewing mode according to a preferred embodiment of the present invention.
Figure 9A:
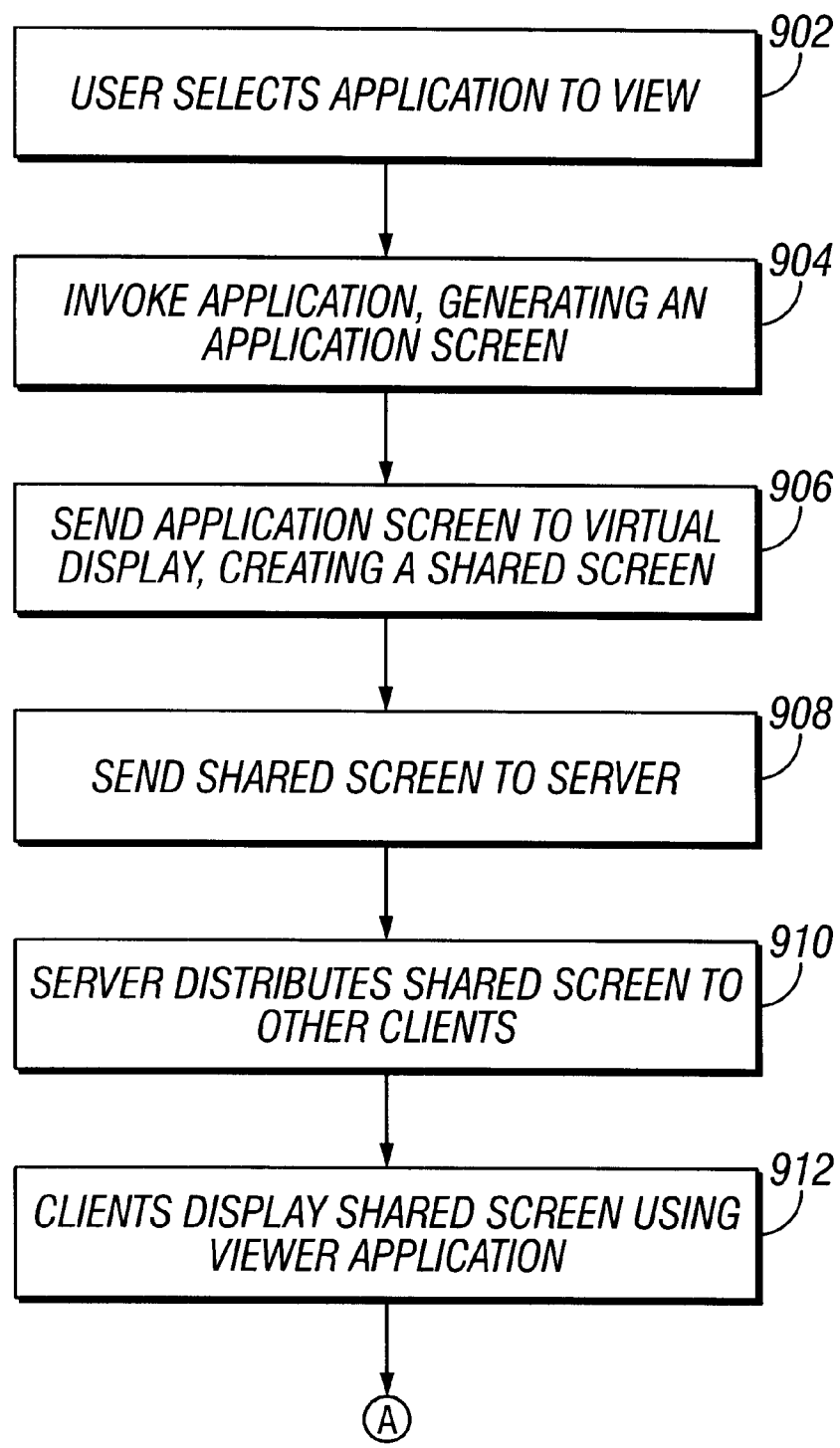
FIGS. 9A and 9B constitute a flowchart depicting the operation of application viewing mode according to a preferred embodiment of the present invention.
Figure 9B:
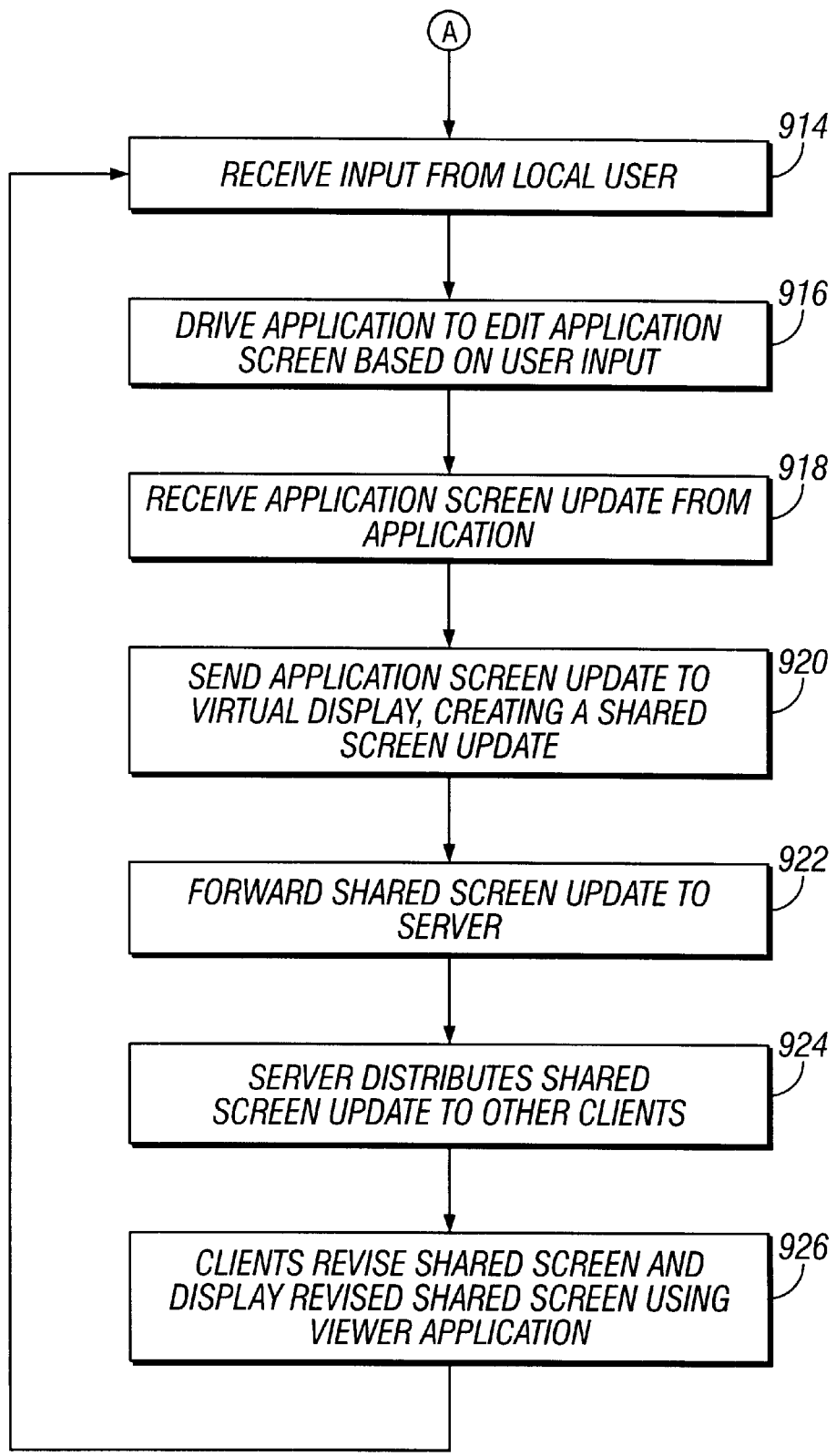

FIG. 8 is a flow diagram depicting the operation of application viewing mode according to a preferred embodiment of the present invention. FIGS. 9A and 9B constitute a flowchart depicting that operation.

A user of document sharing application 210A selects a file editing application to view in step 902. In response, the file editing application is invoked, generating an application screen 802, as shown in step 904. Document sharing application 210A causes application screen 802 to be sent to virtual display driver 504, thereby generating a shared screen 508 as shown in step 906. The shared screen is passed back to document sharing application 210A, which sends the shared screen to server 102 in step 908. Server 102 distributes the shared screen to the other clients in the data conference in step 910. In step 912, the other clients in the data conference, such as the client running document sharing application 210B, display the shared screen using viewer application 308.

Referring to FIG. 8, the users in the data conference that have been granted the role of editor can exchange user input in the form of annotations 804. However, in application viewing mode, the application is controlled only by the owner's user input 806. The other clients in the data conference are not permitted to control the application directly. When document sharing application 210A receives input from the local user in step 914, it forwards this user input 806 to file editing application 502 to drive the application to edit the application screen based on that input, as shown in step 916. In response, the application provides an application screen update 808, which is received by the owner document sharing application 210A in step 918. Document sharing application 210A sends application screen update 808 to virtual display driver 504, thereby creating a shared screen update 510, as shown in step 920. Referring to FIG. 5, shared screen update 510 is passed to document sharing application 210B.

Document sharing application 210A forwards the shared screen update to server 102 in step 922. The server distributes the shared screen update to the other clients in the data conference, as shown in step 924. In response, the clients revise the shared screen currently being displayed using the shared screen update, and display the revised shared screen in step 926.

Application Sharing Mode

Figure 10:
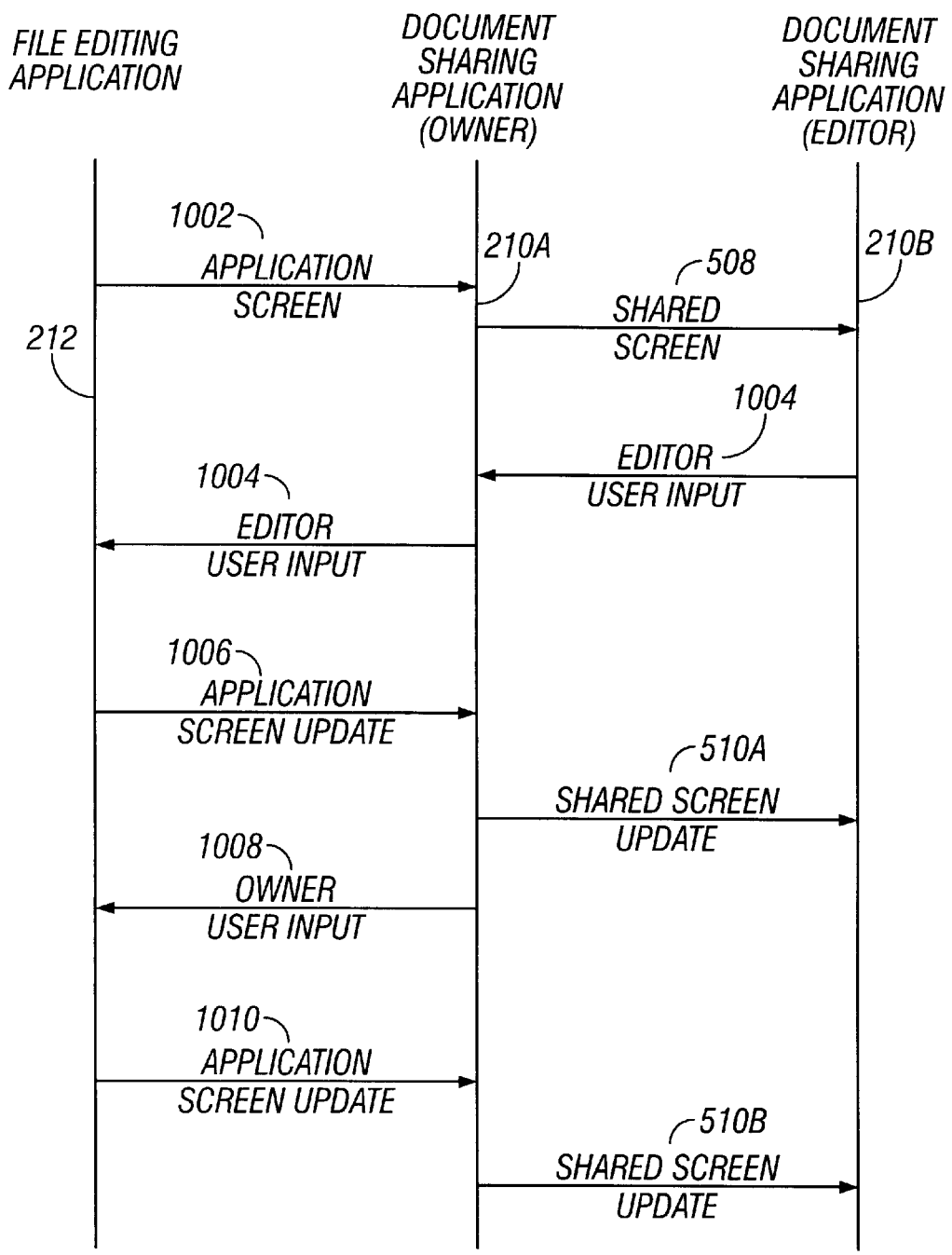
FIG. 10 is a flow diagram depicting the operation of application sharing mode according to a preferred embodiment of the present invention.
Figure 11A:
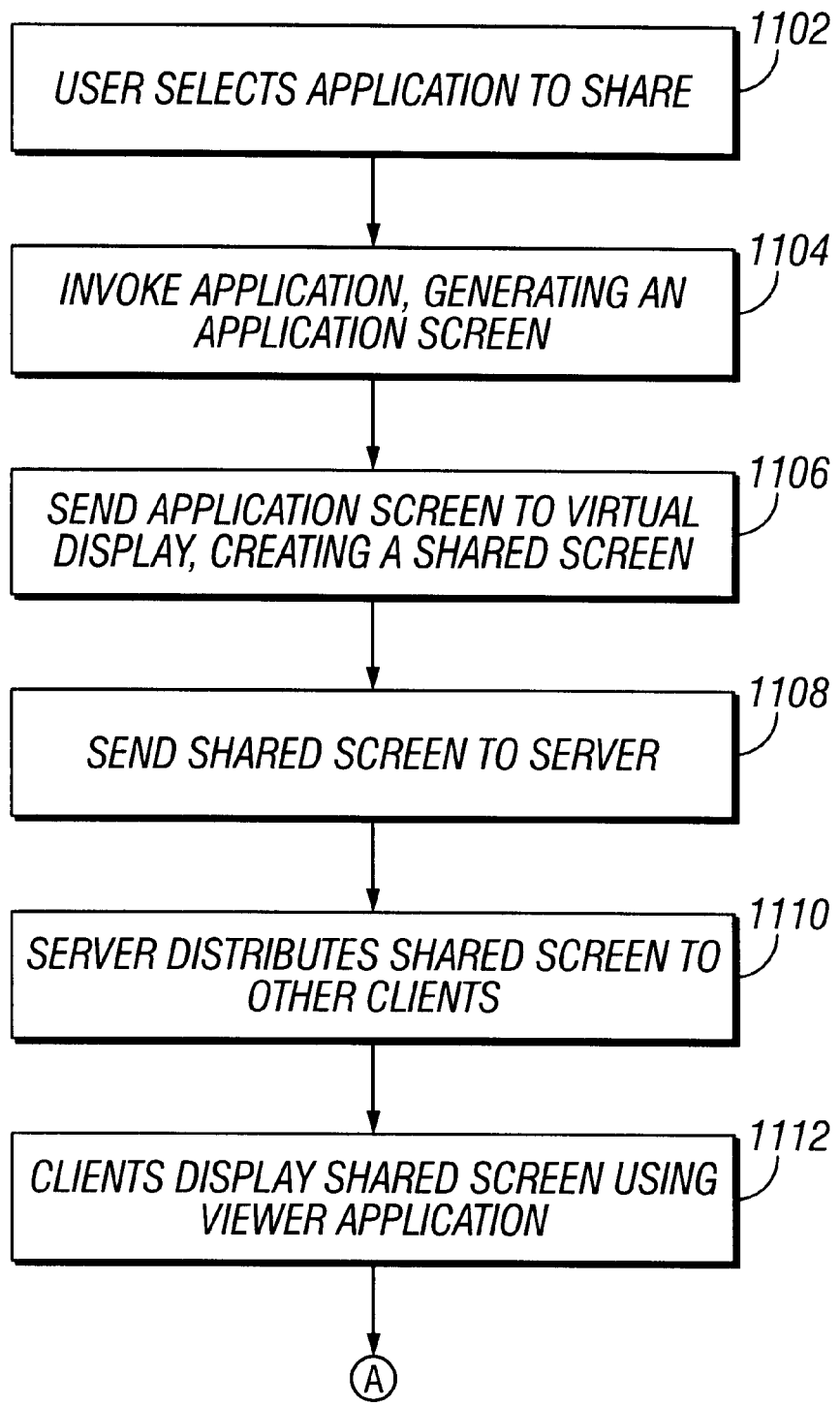
FIGS. 11A and 11B constitute a flowchart depicting the operation of application sharing mode according to a preferred embodiment of the present invention.
Figure 11B:
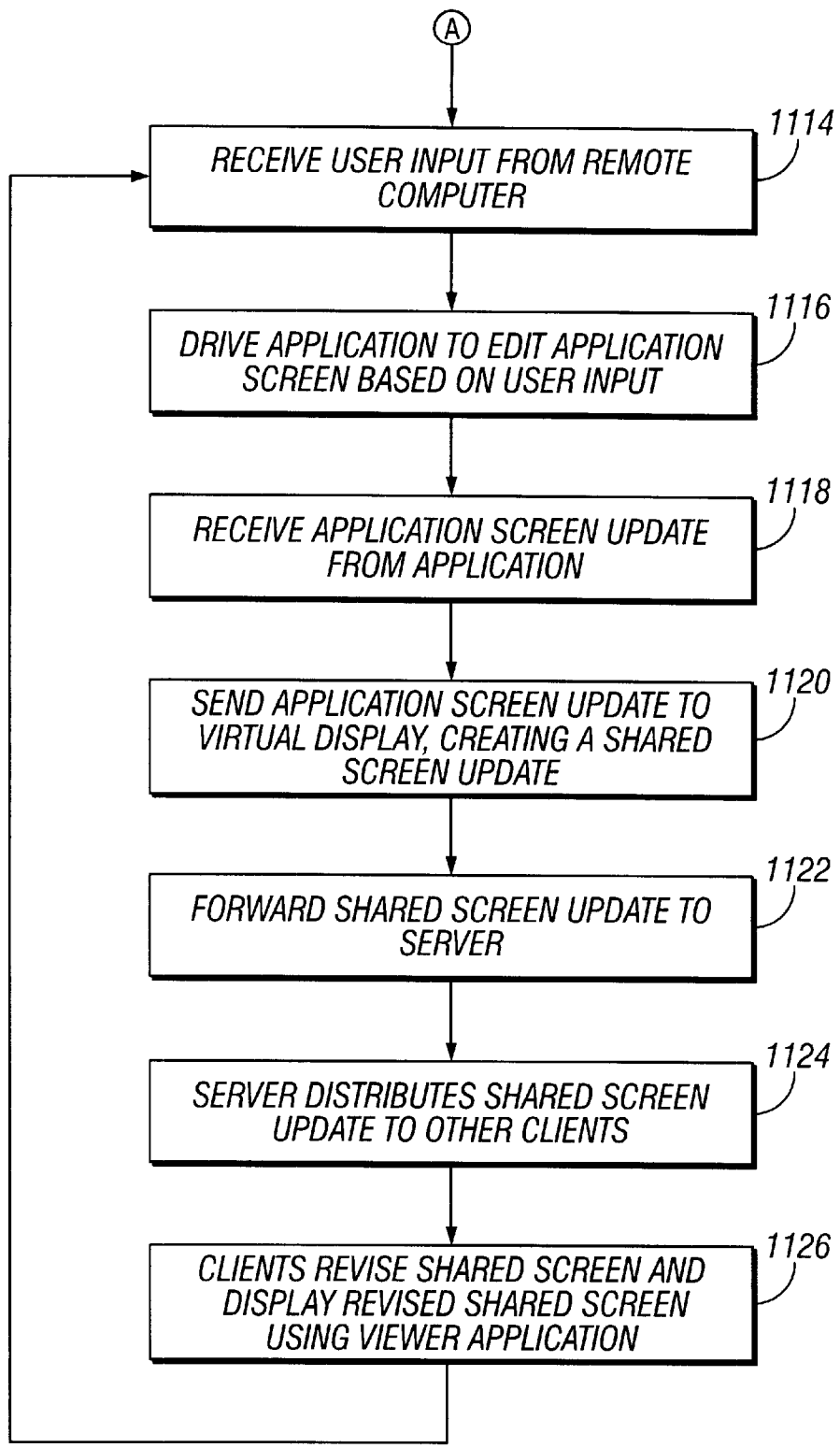

FIG. 10 is a flow diagram depicting the operation of application sharing mode according to a preferred embodiment of the present invention. FIGS. 11A and 11B constitute a flowchart depicting that operation.

A user of document sharing application 210A selects an application to view in step 1102. In response, the application is invoked, generating an application screen 1002, as shown in step 1104. Document sharing application 210A causes application screen 1002 to be sent to virtual display driver 504, thereby generating a shared screen 508 as shown in step 1106. The shared screen is passed back to document sharing application 210A, which sends the shared screen to server 102 in step 1108. Server 102 distributes the shared screen to the other clients in the data conference in step 1110. In step 1112, the other clients in the data conference display the shared screen using viewer application 308.

In application sharing mode, both the owner and editors are permitted to control the file editing application directly. Steps 1114 through 1126 illustrate this process. Referring to FIG. 10, a user of document sharing application 210B generates editor user input 1004, which is sent to owner 210A. Owner 210A receives the editor user input in step 1114, and forwards this input to file editing application 212, thereby driving that application to edit the current application screen based on editor user input 1004 as shown in step 1116. In response, the file editing application generates an application screen update 1006, which is received at owner 210A in step 1118. Owner 210A sends the application screen update to virtual display driver 504, thereby creating a shared screen update 510A, as shown in step 1120.

Referring to FIG. 5, shared screen update 510A is passed to document sharing application 210A, which forwards the shared screen update to server 102, as shown in step 1122. The server distributes the shared screen update to the other clients in the data conference, as shown in step 1124. Each client revises the current shared screen using the shared screen update, and displays the revised shared screen using its viewer application 308, as shown in step 1126. The process of steps 1114 through 1126 is repeated as needed for user input from both the local computer and remote computers.

FIG. 10 also depicts the process whereby the local user (owner) controls the application. According to this process, owner user input 1008 is sent from owner 210A to file editing application 212, thereby driving it to edit the current application screen, and provide an application screen update 1010. The application screen update is sent to virtual display driver 504, creating a shared screen update 510B, which is displayed and forwarded to server 102 for distribution to other clients, which revised their screens accordingly.

Figure 12:
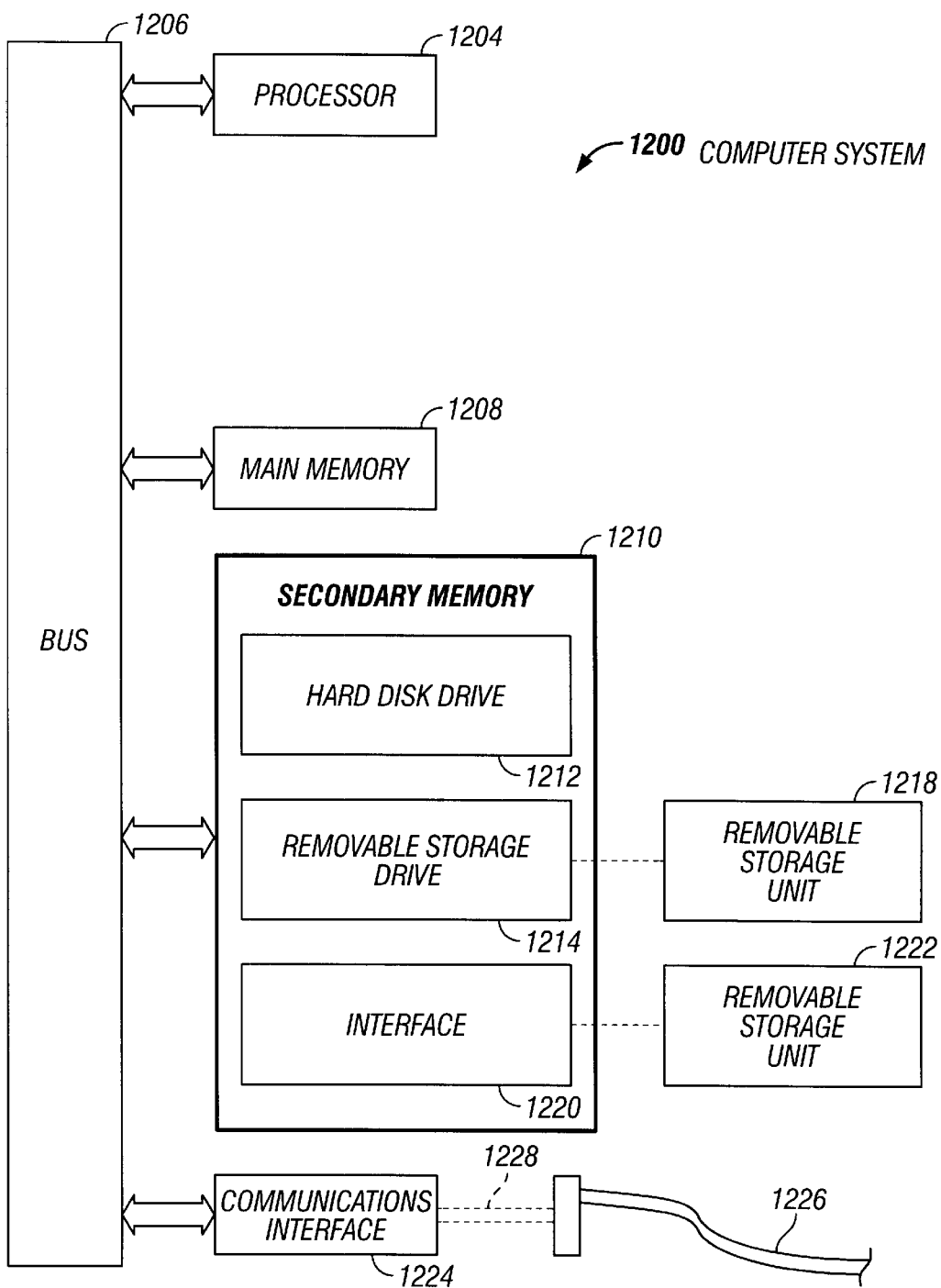
FIG. 12 depicts an example computer system capable of carrying out the functionality of the present invention.

The present invention may be implemented using hardware, software or a combination thereof and may be implemented in a computer system or other processing system. In fact, in one embodiment, the invention is directed toward one or more computer systems capable of carrying out the functionality described herein. An example computer system 1200 is shown in FIG. 12. The computer system 1200 includes one or more processors, such as processor 1204. The processor 1204 is connected to a communication bus 1206. Various software embodiments are described in terms of this example computer system. After reading this description, it will become apparent to a person skilled in the relevant art how to implement the invention using other computer systems and/or computer architectures.

Computer system 1200 also includes a main memory 1208, preferably random access memory (RAM), and can also include a secondary memory 1210. The secondary memory 1210 can include, for example, a hard disk drive 1212 and/or a removable storage drive 1214, representing a floppy disk drive, a magnetic tape drive, an optical disk drive, etc. The removable storage drive 1214 reads from and/or writes to a removable storage unit 1218 in a well known manner. Removable storage unit 1218, represents a floppy disk, magnetic tape, optical disk, etc. which is read by and written to by removable storage drive 1214. As will be appreciated, the removable storage unit 1218 includes a computer usable storage medium having stored therein computer software and/or data.

In alternative embodiments, secondary memory 1210 may include other similar means for allowing computer programs or other instructions to be loaded into computer system 1200. Such means can include, for example, a removable storage unit 1222 and an interface 1220. Examples of such include a program cartridge and cartridge interface (such as that found in video game devices), a removable memory chip (such as an EPROM, or PROM) and associated socket, and other removable storage units 1222 and interfaces 1220 which allow software and data to be transferred from the removable storage unit 1218 to computer system 1200.

Computer system 1200 can also include a communications interface 1224. Communications interface 1224 allows software and data to be transferred between computer system 1200 and external devices. Examples of communications interface 1224 can include a modem, a network interface (such as an Ethernet card), a communications port, a PCMCIA slot and card, etc. Software and data transferred via communications interface 1224 are in the form of signals which can be electronic, electromagnetic, optical or other signals capable of being received by communications interface 1224. These signals 1226 are provided to communications interface 1224 via a channel 1228. This channel 1228 carries signals 1226 and can be implemented using wire or cable, fiber optics, a phone line, a cellular phone link, an RF link and other communications channels.

In this document, the terms "computer program medium" and "computer usable medium" are used to generally refer to media such as removable storage device 1218, a hard disk installed in hard disk drive 1212, and signals 1226. These computer program products are means for providing software to computer system 1200.

Computer programs (also called computer control logic) are stored in main memory 1208 and/or secondary memory 1210. Computer programs can also be received via communications interface 1224. Such computer programs, when executed, enable the computer system 1200 to perform the features of the present invention as discussed herein. In particular, the computer programs, when executed, enable the processor 1204 to perform the features of the present invention. Accordingly, such computer programs represent controllers of the computer system 1200.

In an embodiment where the invention is implemented using software, the software may be stored in a computer program product and loaded into computer system 1200 using removable storage drive 1214, hard drive 1212 or communications interface 1224. The control logic (software), when executed by the processor 1204, causes the processor 1204 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

While various embodiments of the present invention have been described above, it should be understood that they have been presented by way of example, and not limitation. It will be apparent to persons skilled in the relevant art that various changes in form and detail can be placed therein without departing from the spirit and scope of the invention. Thus the present invention should not be limited by any of the above-described example embodiments, but should be defined only in accordance with the following claims and their equivalents.

What is claimed is:

1. An apparatus for automatically sharing a file, comprising:
   a local computer including:
     a document loader;
     a first viewer application;
     a virtual printer; and
     a communication module,
   wherein the document loader is configured to print a file from an application to the virtual printer, the application associated with the file, the virtual printer is configured to create a shared document for use in a live data conference and the first viewer application is configured to display the shared document on the local computer; and
   a remote computer including a second viewer application,
   wherein the communication module is configured to send the shared document to the remote computer and the second viewer application is configured to display the shared document, the shared document being simultaneously displayed by the first viewer application and the second viewer application during the live data conference.

2. The apparatus of claim 1, wherein the local computer further includes:
   an overlay editor configured to create a transparent window appearing to be displayed over the shared document and to create a user-defined object,
   wherein the first viewer application is further configured to display the user-defined object at a user-specified position within the transparent window.

3. The apparatus of claim 2, wherein:
   the communication module is further configured to send data representing the user-defined object and user-specified position to the remote computer and the second viewer application is further configured to display the shared document including the user-defined object at the user-specified position within the transparent window.

4. The apparatus of claim 3, wherein:
   the communication module is further configured to receive data representing a further user-defined object and a further user-specified position from the remote computer and the first viewer application is further configured to display the further user-defined object at the further user-specified position within the transparent window, the transparent window appearing to be displayed over the shared document.

5. The apparatus of claim 1, wherein the communication module is further configured to send the shared document to a plurality of other remote computers, each of the plurality of other remote computers including a viewer application to simultaneously display the shared document during the live data conference.

6. The apparatus of claim 5, wherein the communication module sends the shared document to the remote computer and the plurality of other remote computers through a remote server, the remote server distributing the shared document to the remote computer and the plurality of other remote computers.

7. An apparatus, comprising:
   a local computer including a first viewer application;
   an application invoker configured to invoke an application on the local computer, the application to generate an application screen;
   a document loader configured to send the application screen to a virtual device, the virtual device to create a shared screen for use in a live data conference, the first viewer application to display the shared screen on the local computer;
   a communication module configured to send the shared screen to a remote server for distribution to a remote computer, the remote computer including a second viewer application configured to display the shared screen at the remote computer, the shared screen being simultaneously displayed by the first viewer application and the second viewer application during the live data conference; and
   an input device configured to receive user input from the local computer, the application to edit the application screen based on the user input and generate an application screen update, the application screen update occasioned by the editing of the application screen; and
   a document sharing application configured to receive the application screen update from the application and send the application screen update to the virtual device, the virtual device to create a shared screen update, the first viewer application to update the display of the shared screen with the shared screen update,
   wherein the communication module is further configured to send the shared screen update to the remote server for distribution to the remote computer, the second viewer application to update the display of the shared screen with the shared screen update and the shared screen update, the shared screen update being simultaneously displayed by the first viewer application and the second viewer application during the live data conference.

8. The apparatus of claim 7, wherein the document loader comprises:
   a software program configured to replace the default device driver with a virtual device driver associated with the virtual device.

9. The apparatus of claim 7, wherein the communication module is further configured to send the shared screen to the remote server for distribution to a plurality of other remote computers, each of the plurality of other remote computers including a viewer application to simultaneously display the shared screen or the shared screen update during the live data conference.

10. An apparatus, comprising:
a local computer including a first viewer application;
an application invoker configured to invoke an application on the local computer, the application to generate an application screen;
a document loader configured to send the application screen to a virtual device the virtual device to create a shared screen for use in a live data conference, the first viewer application to display the shared screen on the local computer;
a communication module configured to send the shared screen to a remote server for distribution to a remote computer, the remote computer including a second viewer application to display the shared screen at the remote computer, the shared screen being simultaneously displayed by the first viewer application and the second viewer application during the live data conference; and
an input device to receive user input from the remote computer,
wherein the application is configured to edit the application screen based on the user input.

11. The apparatus of claim 10, further comprising:
a document sharing application to receive an application screen update from the application, the application screen update occasioned by an editing of the application screen; and
a document loader to send the application screen update to the virtual device, the virtual device to create a shared screen update, the first viewer application to update the display of the shared screen with the shared screen update;
wherein the communication module is further configured to send the shared screen update to the remote computer, the second viewer application to update the display of the shared screen with the shared screen update at the remote computer, the shared screen update being simultaneously displayed by the first viewer application and the second viewer application during the live data conference.

12. The apparatus of claim 11, wherein the shared screen update represents only the portion of the application screen that was edited.

13. The apparatus of claim 12, wherein the document loader comprises:
a software program configured to replace a default device driver with a virtual device driver associated with the virtual device.

14. The apparatus of claim 10, wherein the communication module is further configured to send the shared screen to the remote server for distribution to a plurality of other remote computers, each of the plurality of other remote computers including a viewer application to simultaneously display the shared screen or the shared screen update during the live data conference.

15. An apparatus, comprising:
a remote computer including:
 a first viewer application;
 an application invoker configured to invoke an application on the remote computer, the application to generate an application screen; and
 a document loader configured to send the application screen to a virtual device, the virtual device to create a shared screen for use in a live data conference, the first viewer application to display the shared screen on a first display device attached to the remote computer;
a local computer including:
 a second viewer application configured to display the shared screen on a second display device attached to the local computer, the shared screen being simultaneously displayed on the first display device and the second display device during the live data conference;
 an input device configured to receive user input from the local computer;
 a communication module configured to send the user input to a remote server for distribution to the remote computer, where the application associated with the application screen edits the application screen based on the user input to generate an application screen update, the application screen update occasioned by the editing of the application screen, the document loader to send the application screen update to the virtual device, the virtual device to generate a shared screen update; and
 a document sharing application configured to receive the shared screen update from the remote computer, the shared screen update representing only the portion of the application screen that was edited,
wherein the first viewer application is further configured to update the display of the shared screen on the first display device and the second viewer application is further configured to update the second display device using the shared screen update, and wherein the shared screen update is simultaneously displayed on the first display device and the second display device during the live data conference.

16. A method for automatically sharing a file, comprising:
printing a file, on a local computer, to a virtual printer from application associated with the file to create a shared document for use in a live data conference;
displaying the shared document on the local computer using a first viewer application;
sending the shared document to a remote computer; and
displaying the shared document at the remote computer using a second viewer application, wherein the shared document is simultaneously displayed by the first viewer application and the second viewer application during the live data conference.

17. The method of claim 16, further comprising:
creating a transparent window appearing to be displayed over the shared document;
creating a user-defined object; and
displaying the user-defined object at a user-specified position within the transparent window.

18. The method of claim 17, further comprising:
sending data representing the user-defined object and user-specified position to the remote computer; and
displaying the shared document including the user-defined object at the user-specified position within the transparent window.

19. The method of claim 18, further comprising:
receiving data representing a further user-defined object and a further user-specified position from the remote computer; and displaying the further user-defined object at the further user-specified position within the transparent window, the transparent window appearing to be displayed over the shared document.

20. A method, comprising:

invoking an application, on a local computer to generate an application screen;

sending the application screen to a virtual device to create a shared screen for use in a live data conference;

displaying the shared document on the local computer using a first viewer application;

sending the shared screen to a remote server for distribution to a remote computer;

displaying the shared screen at the remote computer using a second viewer application, the shared screen being simultaneously displayed by the first viewer application and the second viewer application during the live data conference;

receiving user input from the local computer;

driving the application to edit the application screen based on the user input;

receiving an application screen update from the application, the application screen update occasioned by the editing of the application screen;

sending the application screen update to the virtual device to create a shared screen update;

revising the display of the shared screen using the shared screen update on the first display device using the first viewer application;

sending the shared screen updated to the remote server for distribution to the remote computer; and revising the display of the shared screen with the shared screen update on the second display device using the second viewer application, wherein the shared screen update is simultaneously displayed by the first viewer application and the second viewer application during the live data conference.

21. The method of claim 20, wherein the step of sending the application screen comprises:

replacing a default device driver with a virtual device driver associated with the virtual device.

22. A method, comprising:

invoking an application on a local computer to generate an application screen for use in a live data conference;

sending the application screen to a virtual device to create a shared screen;

displaying the shared screen on the local computer using a first viewer application;

sending the shared screen to a remote server for distribution to a remote computer;

displaying the shared screen at the remote computer using a second viewer application, the shared screen being simultaneously displayed by the first viewer application and the second viewer application during the live data conference;

receiving user input from the remote computer; and driving the application to edit the application screen based on the user input.

23. The method of claim 22, further comprising:

receiving an application screen update from the application, the application screen update occasioned by an editing of the application screen; and sending the application screen update to the virtual device to create a shared screen update;

sending the shared screen update to the remote computer; and revising the display of the shared screen with the shared screen update using the second viewer application.

24. The method of claim 23, wherein the shared screen update represents only the portion of the application screen that was edited.

25. The method of claim 24, wherein the step of sending the application screen comprises:

replacing a default device driver with a virtual device driver associated with the virtual device.

26. The method of claim 25, further comprising:

presenting a display of the shared screen on a display device attached to the local computer using the first viewer application.

27. The method of claim 26, further comprising:

revising the display of the shared screen on the display device with the shared screen update using the first viewer application.

28. A method, comprising:

presenting, on a first display device attached to a local computer, a display of a shared screen generated at a remote computer by sending an application screen to a virtual device, the remote computer simultaneously displaying the shared screen on a second display device attached to the remote computer;

receiving user input from the local computer;

sending the user input to a remote server for distribution to the remote computer, where an application associated with the application screen edits the application screen based on the user input;

receiving a shared screen update from the remote computer, the shared screen update occasioned by the editing of the application screen, wherein the shared screen update represents only the portion of the application screen that was edited; and revising the display of the shared screen using the shared screen update on the first display device using the first viewer application and the second display device using the second viewer application.

29. A computer program automatically sharing a file, the computer program tangibly stored on a computer-readable medium, containing instructions for causing a computer to:

print a file, on the computer, to a virtual printer from an application associated with the file to create a shared document for use in a live data conference;

display the shared document on the local computer using a first viewer application;

send the shared document to a remote computer; and display the shared document at the remote computer using a second viewer application, wherein the shared document is simultaneously displayed by the first viewer application and the second viewer application during the live data conference.

30. The computer program of claim 29, further including instructions for causing the computer to:

create a transparent window appearing to be displayed over the shared document;

create a user-defined object; and display the user-defined object at a user-specified position within the transparent window.

31. The computer program of claim 30, further including instructions for causing the computer to:

send data representing the user-defined object and user-specified position to the remote computer;

display the shared document including the user-defined object at the user-specified position within the transparent window.

32. The computer program of claim 31, further including instructions for causing the computer to:
receive data representing a further user-defined object and a further user-specified position from the remote computer; and
display the further user-defined object at the further user-specified position within the transparent window, the transparent window appearing to be displayed over the shared document.

33. A computer program tangibly stored on a computer-readable medium, containing instructions for causing a computer to:
invoke an application on the computer to generate an application screen;
send the application screen to a virtual device to create a shared screen for use in a live data conference;
display the shared document on the local computer using a first viewer application;
send the shared screen to a remote server for distribution to a remote computer;
display the shared screen at the remote computer using a second viewer application, the shared screen being simultaneously displayed by the first viewer application and the second viewer application during the live data conference;
receive user input from the local computer;
drive the application to edit the application screen based on the user input;
receive an application screen update from the application, the application screen update occasioned by the editing of the application screen;
send the application screen update to the virtual device to create a shared screen update;
revise the display of the shared screen using the shared screen update on the first display device using the first viewer application;
send the shared screen update to the remote server for distribution to the remote computer; and
revise the display of the shared screen with the shared screen update on the second display device using the second viewer application, wherein the shared screen update is simultaneously displayed by the first viewer application and the second viewer application during the live data conference.

34. The computer program of claim 33, further including instructions for causing the computer to:
replace a default device driver with a virtual device driver associated with the virtual device.

35. A computer program tangibly stored on a computer-readable medium, containing instructions for causing a computer to:
invoke an application on a the computer to generate an application screen for use in a live data conference;
send the application screen to a virtual device to create a shared screen;
display the shared screen on the local computer using a first viewer application;
send the shared screen to a remote server for distribution to a remote computer;
display the shared screen at the remote computer using a second viewer application, the shared screen being simultaneously displayed by the first viewer application and the second viewer application during the live data conference;
receive user input from the remote computer; and
drive the application to edit the application screen based on the user input.

36. The computer program of claim 35, further including instructions for causing the computer to:
receive an application screen update from the application, the application screen update occasioned by an editing of the application screen; and
send the application screen update to the virtual device to create a shared screen update;
send the shared screen update to the remote computer; and
revise the display of the shared screen with the shared screen update using the second viewer application.

37. The computer program of claim 36, wherein the shared screen update represents only the portion of the application screen that was edited.

38. The computer program of claim 37, further including instructions for causing the computer to:
replace a default device driver with a virtual device driver associated with the virtual device.

39. The computer program of claim 38, further including instructions for causing the computer to:
present a display of the shared screen on a display device attached to the local computer using the first viewer application.

40. The computer program of claim 39, further including instructions for causing the computer to:
revise the display of the shared screen using the shared screen update on the display device using the first viewer application.

41. A computer program tangibly stored on a computer-readable medium, containing instructions for causing a computer to:
present, on a first display device attached to the computer, a display of a shared screen generated at a remote computer by sending an application screen to a virtual device, the remote computer simultaneously displaying the shared screen on a second display device attached to the remote computer;
receive user input from the computer;
send the user input to a remote server for distribution to the remote computer, where an application associated with the application screen edits the application screen based on the user input;
receive a shared screen update from the remote computer, the shared screen update occasioned by the editing of the application screen, wherein the shared screen update represents only the portion of the application screen that was edited; and
revise the display of the shared screen using the shared screen update on the first display device using the first viewer application and the second display device using the second viewer application.

42. A system for sharing a file comprising:
a local computer configured to create a shared document that can be displayed at the local computer using a first viewer application;
a communication module configured to send the shared document to a remote computer for use in a live data conference; and the remote computer having a second viewer application to display the shared document, wherein the shared document that is displayable simultaneously displayed by the first viewer application and the second viewer application.

43. The system of claim 42, wherein the shared document can be send to a plurality of other remote computers, each of the plurality of other remote computers including a viewer application to simultaneously display the shared document during the live data conference.

44. A system for sharing an application screen comprising:

- a local computer configured to create an application screen that can be displayed at the local computer using a first viewer application;
- a communication module configured to send the application screen to a remote computer for use in a live data conference; and
- the remote computer having a second viewer application to display the application screen, wherein the application screen that is displayable simultaneously displayed by the first viewer application and the second viewer application.

* * * * *